United States Patent [19]

Hawkins

[11] 4,023,694
[45] May 17, 1977

[54] TRAILER FRAME WITH LOAD BUNKS

[76] Inventor: Lloyd J. Hawkins, 14922 Coldwater Road, Fort Wayne, Ind. 46825

[22] Filed: Aug. 15, 1975

[21] Appl. No.: 605,038

[52] U.S. Cl. ............................. 214/396; 280/5 R; 280/179 R; 403/234
[51] Int. Cl.² ..................... B60P 1/54; B60P 3/32
[58] Field of Search .......... 214/394, 396; 248/146, 248/150, 129; 280/5 R, 179 R; 211/182; 403/186, 189, 190, 233, 234

[56] References Cited

UNITED STATES PATENTS

| 2,296,611 | 9/1942 | Green | 214/396 |
| 3,338,433 | 8/1967 | Mattson et al. | 214/10.5 R X |

*Primary Examiner*—Robert G. Sheridan
*Attorney, Agent, or Firm*—Berman, Aisenberg & Platt

[57] ABSTRACT

A gas tank-carrying trailer consisting of a wheeled U-shaped main frame with hitch means and a supporting dolly at its bight portion. The rear portion of the main frame carries an arched tank-lifting frame structure provided with winch means for lifting a tank above the level of the main frame. The arms of the main frame have spaced pairs of positioning lugs, and load bunks are provided with spaced right-angled plate-like vertical end portions supportable on the arms between the positioning lugs. The positioning lugs act to positively hold the bunks in transverse supporting positions when the tank is lowered onto the bunks. The tank is held down on the bunks by straps or chains whose ends are hooked to cross rods connecting the plate-like end portions of the bunks. Vertical channels are provided on the tank-lifting frame structure spaced from the main post elements thereof to define receiving spaces for the end portions of the bunks for storing the bunks in stacked transverse positions on the frame structure when not in use. Removable locking pins are provided on the top ends of the channels for holding the end portions of the bunks in the receiving spaces. The frame structure may be folded down onto the main frame to facilitate transportation of the trailer when it is not carrying a tank.

17 Claims, 9 Drawing Figures

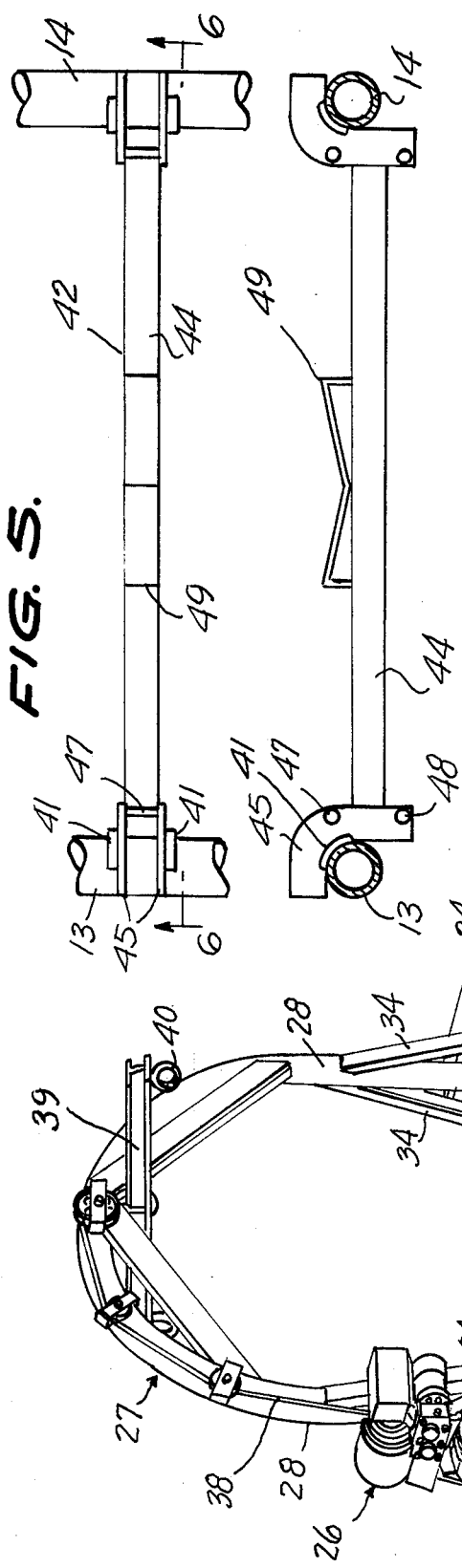
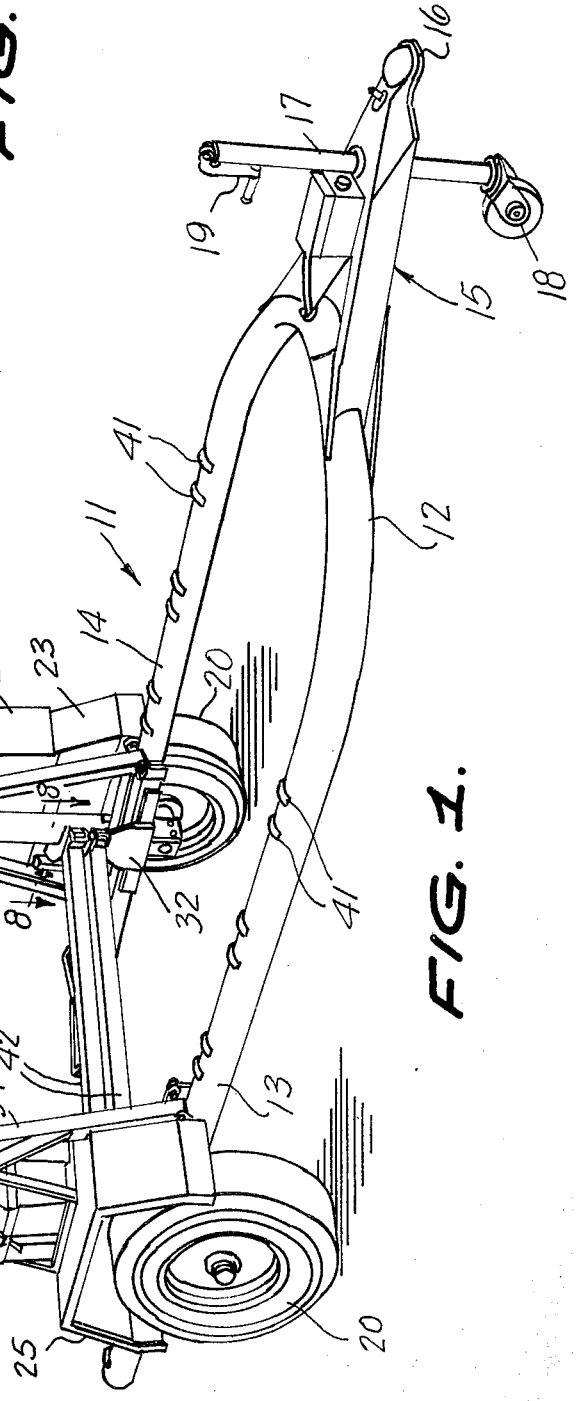

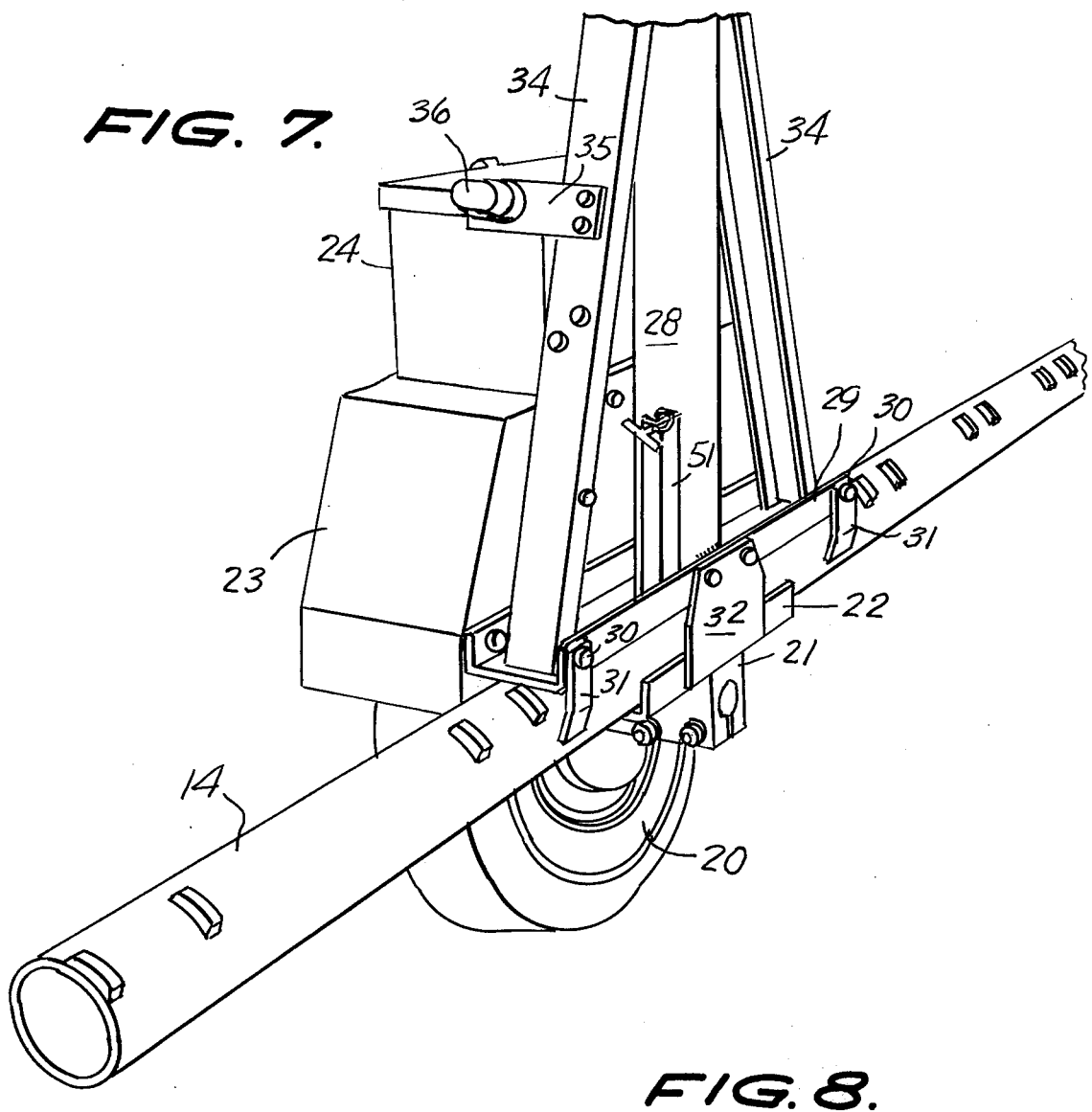
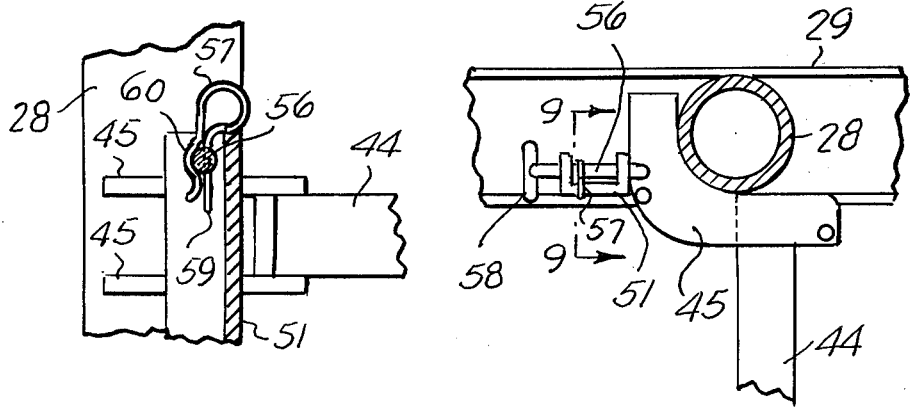

TRAILER FRAME WITH LOAD BUNKS

This invention relates to load-carrying trailers, and more particularly to a tank-carrying trailer of the type employing load bunks to support a tank thereon while being transported by the trailer.

A main object of the invention is to provide a novel and improved tank-carrying trailer which is relatively simple in construction, which is provided with tank-supporting bunks which are positively held in position on the frame of the trailer and which cannot shift during transportation of a tank, and which employs simple and inexpensive structural elements.

A further object of the invention is to provide an improved tank-carrying trailer employing load bunks to support a tank thereon, the bunks being inexpensive to fabricate, being durable in construction, and the trailer having means cooperating with the bunks to positively retain them in load-carrying positions with the associated tank securely fastened and held against shifting during transportation thereof.

A still further object of the invention is to provide an improved tank-carrying trailer structure of the type employing a wheeled main frame and load supporting bunks transversely engaged on said main frame, the bunks being provided with means for easily fastening hold down chains or straps thereto to fasten a tank securely to the bunks and to prevent shifting of the tank relative to the trailer structure while it is being transported, the trailer structure being further provided with means for easily and safely storing the bunks when not in use and for holding the stored bunks in stacked superimposed relationship on the main frame of the trailer structure.

A still further object of the invention is to provide improved load bunks for a tank-carrying trailer, the load bunks being very inexpensive to fabricate, being sturdy in construction, and having simple and effective means to cooperate with retaining structure on the associated trailer to insure against shifting of the bunks and of a tank supported thereon during transportation of the tank.

Further objects and advantages of the invention will become apparent from the following description and claims, and from the accompanying drawings, wherein:

FIG. 1 is a perspective view of an improved tankcarrying trailer constructed in accordance with the present invention showing the load bunks thereof in stored inoperative positions.

FIG. 5 is a top plan view of one of the load bunks employed in the assembly of FIGS. 1 to 4, shown in working engagement with portions of the side arms of the main frame of the trailer.

FIG. 6 is a transverse vertical cross-sectional view taken substantially on line 6—6 of FIG. 5.

FIG. 7 is an enlarged fragmentary perspective view of the left rear portion of the trailer assembly of FIG. 1 showing the means for storing the load bunks when not in use.

FIG. 8 is an enlarged fragmentary horizontal cross-sectional view taken substantially on line 8—8 of FIG. 1.

FIG. 9 is a vertical cross-sectional view taken substantially on line 9—9 of FIG. 8.

Figure 2:
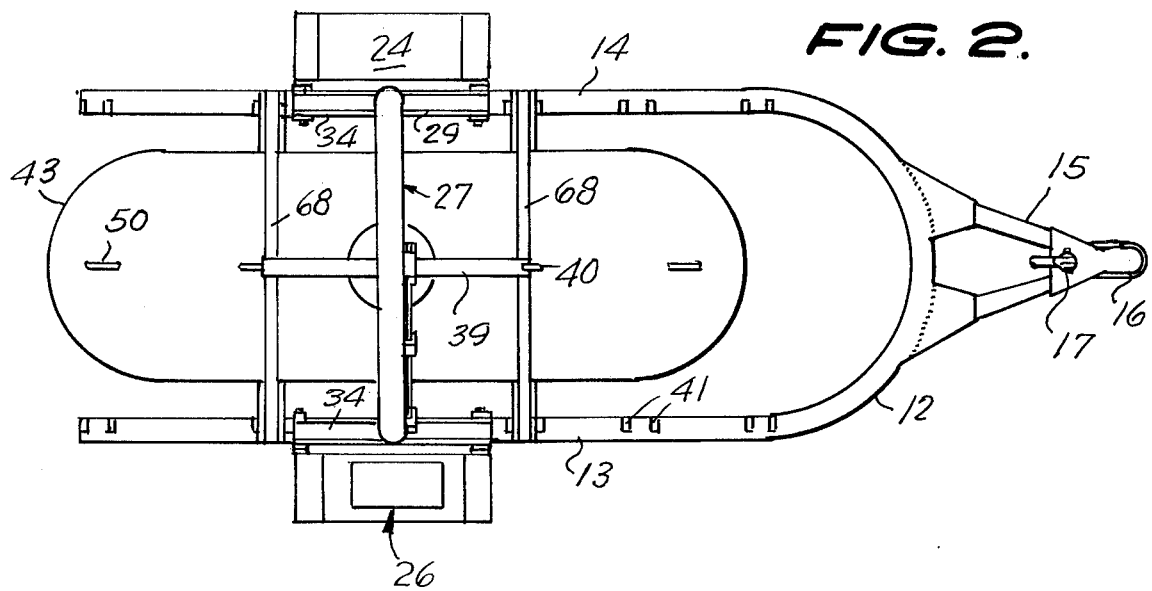
FIG. 2 is a top plan view of the trailer of FIG. 1 with a gas tank mounted thereon and secured thereto for transportation, with the load bunks in operative positions beneath the tank.

Referring to the drawings, 11 generally designates an improved tank-carrying trailer assembly constructed in accordance with the present invention. The assembly 11 comprises a U-shaped main frame 12 having respective side arms 13 and 14. The main frame member 12 may be of any suitable construction, and is illustrated by way of example as being made of tubular material for lightness and economy. The bight portion of the main frame 12 is provided with conventional hitch means comprising a generally V-shaped forwardly extending hitch frame assembly 15 rigidly secured to the bight portion of main frame 12 and having a hitch loop 16 at its forward end. The forward end portion of the hitch assembly 15 is provided with a vertical dolly post structure 17 containing a conventional dolly shaft having a dolly wheel swivelly connected to the lower end portion thereof, including the dolly wheel 18. Conventional means is provided, including a manually operated crank 19, for raising or lowering the dolly wheel 18.

Suitably journalled to the rear portions of the side arms 13 and 14 are respective road-engaging supporting wheels 20, 20. The wheels 20 are journalled to suitable frame structures 21 which are in turn rigidly secured to the side arms 13 and 14 of the main frame 12, the structures 21 including upwardly facing longitudinally extending channel members 22 which receive respective side arms 13 and 14 of the main frame member 12.

The frame structure 21 adjacent the side arm 14 includes a fender 23 on which is mounted a storage compartment 24. The frame structure 21 adjacent the side arm 13 includes a fender 25 on which is mounted a winch assembly 26.

Figure 3:
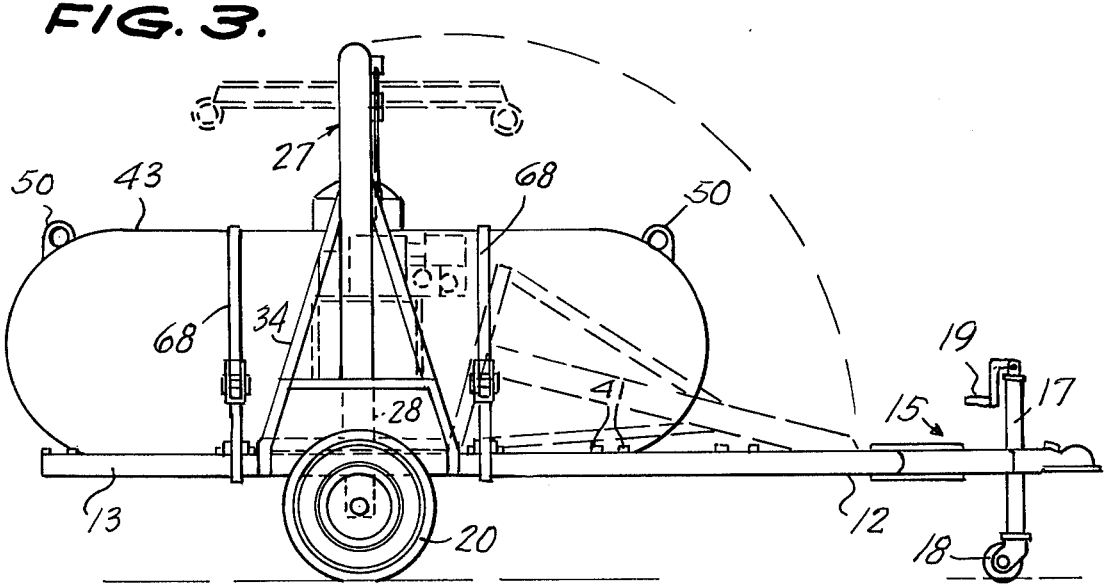
FIG. 3 is a side elevational view of the loaded trailer of FIG. 2.
Figure 4:
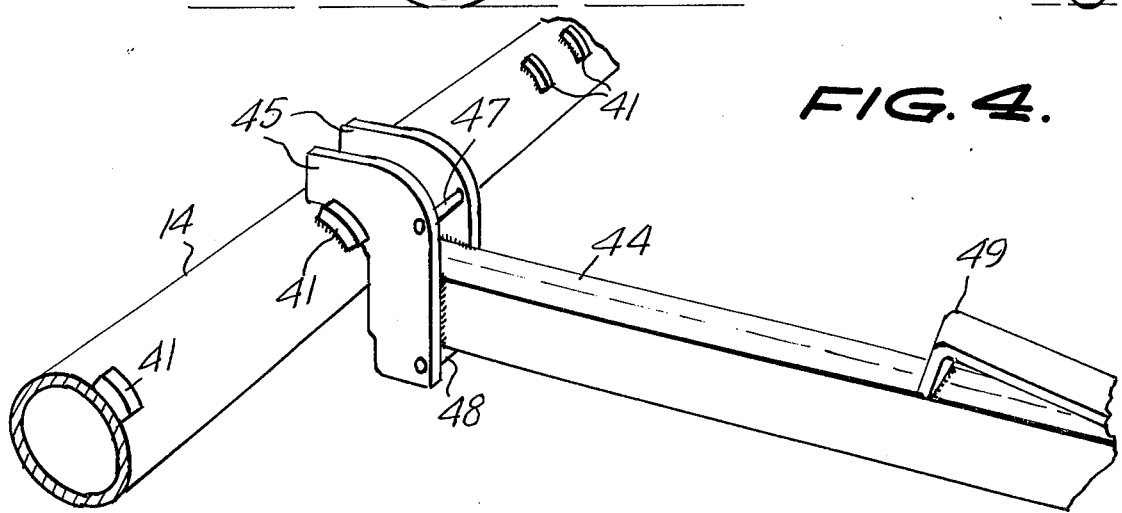
FIG. 4 is an enlarged fragmentary perspective view showing the working engagement of one of the end portions of a load bunk with an arm of the main frame of the trailer of FIGS. 1 to 3.

A generally U-shaped tank-lifting arch member 27 extends transversely over the rear portion of the main frame 12 and has respective side post elements 28, 28 whose lower ends are rigidly secured, as by welding, in respective upwardly facing channel members 29, 29 overlying respective main frame side arms 13, 14. The respective front and rear portions of the flanges of the channel members 29 are secured by bolts 30 to upstanding lugs 31 rigidly secured to the side arms 14 and 13. The bolts 30 are removable so that the rear bolts can be at times removed to allow the arch structure to be rotated to an inoperative position resting on the main frame member 12, as shown in dotted view in FIG. 3 to facilitate transportation of the trailer when it is not carrying a tank.

Secured to the intermediate portions of the flanges of the channel bars 29 are depending guide plates 32 which are slidably engagable with the upstanding flange portions of the channel members 22 when the tank-elevating arch member is returned to its upstanding position and which acts as side sway-inhibiting plates to insure and to assist in maintaining positive alignment of the channel members 29 with the side arms 13, 14 of main frame 12.

The post portions 28 of the arch member 27 are rigidly braced to the channel bars 29 by respective pairs of upwardly convergent channel bars 34, 34 rigretaining means for the bunks under working conditions. Furthermore, it will be seen that the bunks are designed so that they have anchor means engageably by the end hooks of the tank binding chains or binding strap assemblies in a manner to cause the load 43, the bunks and the trailer frame to be securely tied together. Also, it will be apparent that the assembly described above provides a safe and reliable means of storing the load bunks when they are not in use.

While a specific embodiment of an improved load-carrying trailer assembly has been disclosed in the foregoing description, it will be understood that various modifications within the spirit of the invention may occur to those skilled in the art. Therefore, it is intended that no limitations be placed on the invention except as defined by the scope of the appended claims.

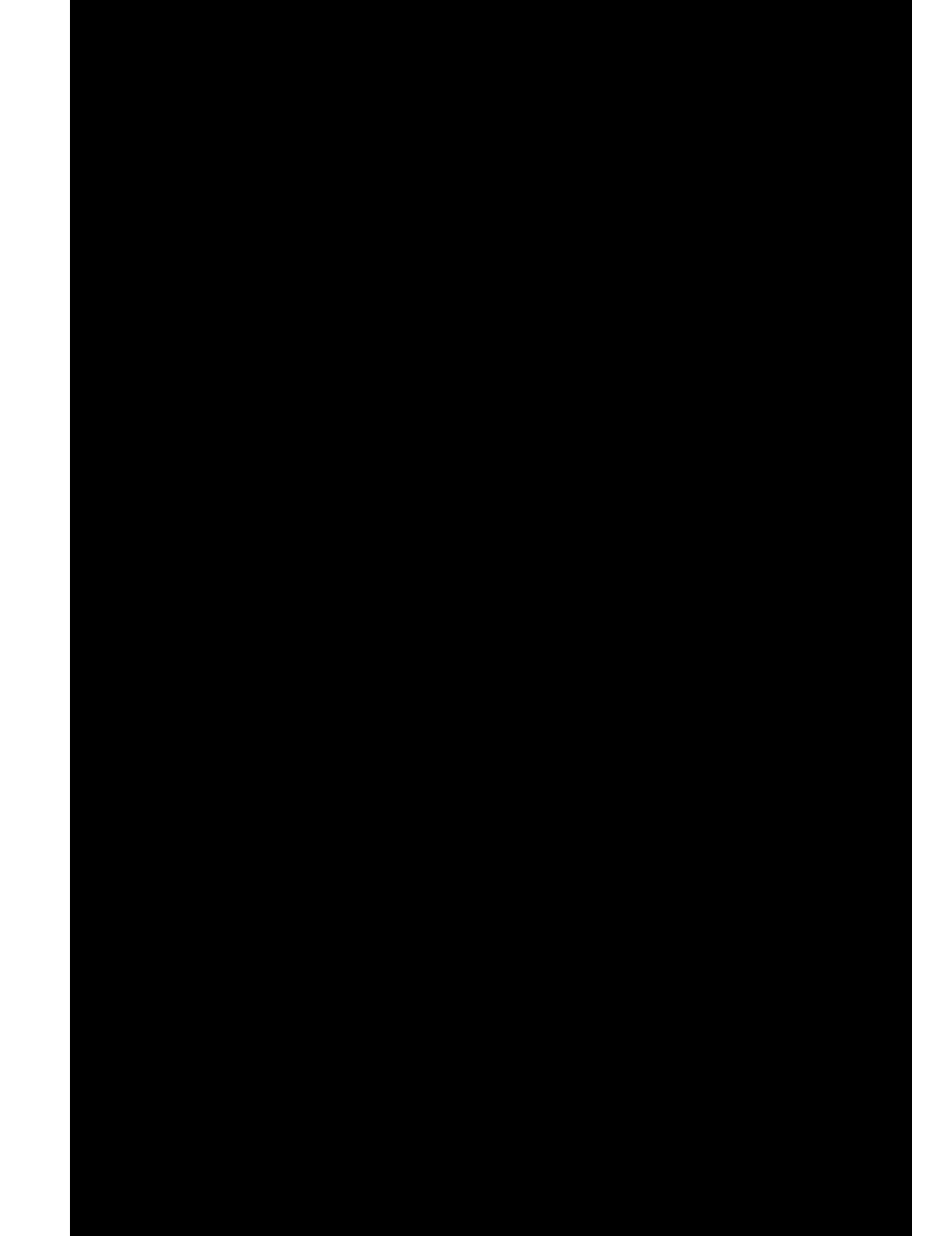

What is claimed is:

1. A load-carrying trailer assembly comprising a wheeled main frame having two side arms of substantially regular geometric cross-section, at least one set of transversely aligned pairs of spaced lugs on each of said side arms, each of said lugs being fixedly secured to said side arms; at least one load supporting bunk having projections at either end thereof, the width of said projections being approximately equal to the spacing between said pairs of lugs; and said projections being snugly disposed between opposite pairs of said lugs, so as to prevent longitudinal movement of said bunk relative to said frame when a load is placed on said bunk.

2. The load-carrying trailer assembly of claim 1, and anchor means on the lower ends of said projections of the bunks for connection to load binder means engaged around a load supported on the bunks.

3. The load-carrying trailer assembly of claim 1, and storage means on said main frame for securing the bunks in transverse vertically stacked relation on said main frame when the bunks are not in use.

4. The load-carrying trailer assembly of claim 1, and wherein said bunks comprise substantially straight main bar portions and said end portions comprise pairs of generally L-shaped plate members secured to opposite sides of the ends of said main bar portions in parallel relation with their top arms projecting outwardly.

5. The load-carrying trailer assembly of claim 4, and cross rod elements connecting the L-shaped plate members at their lower portions to define anchor means for a load binder.

6. The load-carrying trailer assembly of claim 5, and wherein the L-shaped plate members have rounded inside corner portions.

7. The assembly set forth in claim 1 wherein said projections are shaped to substantially conform to said crosssection of said side arms.

8. The assembly set forth in claim 7 wherein said lugs are shaped to substantially conform to the outer surface of said side arms.

9. The load-carrying trailer assembly of claim 8, and wherein said projections are generally right-angular in shape and engage the side arms at their inside corner portions.

10. A load-carrying trailer assembly comprising a wheeled generally U-shaped main frame, at least one set of transversely aligned pairs of lugs on the side arms of said main frame, and loadsupporting bunks having end portions formed to supportingly engage on said side arms, said end portions being closely receivable between transversely aligned pairs of lugs to maintain the bunks transverse relative to said side arms when a load is placed on the bunks and to prevent shifting of the bunks, said end portions comprising pairs of spaced parallel generally L-shaped plate members on the ends of the bunks with outwardly directed top arms, said plate members being spaced so as to be closely received between pairs of lugs with the inside corner portions of the plate members engaging the side arms.

11. The load-carrying trailer assembly of claim 10, and wherein said inside corner portions are shaped to substantially conform with the shape of said side arms.

12. The load-carrying trailer assembly of claim 10, and cross rod elements connecting the plate members and defining anchor means for connecting load binder means engaged around the load supported on the bunks.

13. The load-carrying trailer assembly of claim 12, and wherein said bunks are provided at their midportions with upwardly facing concave saddle elements for supportingly receiving a rounded load.

14. A load-carrying trailer assembly comprising a wheeled generally U-shaped main frame, at least one set of transversely aligned pairs of lugs on the side arms of said main frame, and loadsupporting bunks having end portions formed to supportingly engage on said side arms, said end portions being closely receivable between transversely aligned pairs of lugs to maintain the bunks transverse relative to said side arms when a load is placed on the bunks and to prevent shifting of the bunks, and storage means on said main frame for securing the bunks in transverse vertically stacked relation on said main frame when the bunks are not in use, said storage means comprising spaced upstanding members secured on said side arms shaped to lockingly receive said end portions therebetween, and removable retention means on at least one of the upstanding members located to overlie the end portion of the uppermost bunk.

15. A load-carrying trailer assembly comprising a wheeled generally U-shaped main frame, at least one set of transversely aligned. pairs of lugs on the side arms of said main frame, and loadsupporting bunks having end portions formed to supportingly engage on said side arms, said end portions being closely receivable between transversely aligned pairs of lugs to maintain the bunks transverse relative to said side arms when a load is placed on the bunks and to prevent shifting of the bunks, and a transversely extending vertical hoist arch member secured on said main frame, said hoist arch member having respective side post elements extending perpendicular to the side arms of the main frame, and upstanding bars on the arch member spaced from the side post elements extending perpendicular to the side arms of the main frame and defining therewith receiving spaces for the end portions of the bunks, and removable retention pins extending through the bars and located to retentively overlie the end portions of the bunks, for retentively storing the bunks in stacked transverse positions when not in use.

16. A load-carrying trailer assembly comprising a wheeled generally U-shaped main frame, at least one set of transversely aligned pairs of lugs on the side arms of said main frame, and loadsupporting bunks having end portions formed to supportingly engage on said side arms, said end portions being closely receivable between transversely aligned pairs of lugs to maintain the bunks transverse relative to said side arms when a load is placed on the bunks and to prevent shifting of the bunks, wherein said bunks comprise substantially